UNITED STATES PATENT OFFICE.

CHARLES ELDRID BURKE, OF BERKELEY, AND DONALD EASTMAN FOGG, OF OAKLAND, CALIFORNIA.

PRESERVING FRUIT-JUICES.

1,197,442.     Specification of Letters Patent.     Patented Sept. 5, 1916.

No Drawing.     Application filed October 3, 1914. Serial No. 864,865.

*To all whom it may concern:*

Be it known that we, CHARLES ELDRID BURKE, a subject of the King of England, residing at Berkeley, Alameda county, State of California, and DONALD EASTMAN FOGG, a citizen of the United States, residing at Oakland, in the county of Alameda and State of California, have invented new and useful Improvements in Preserving Fruit-Juices, of which the following is a specification.

The invention relates to a new and useful process and product for the preservation of natural fruit juices and especially the juices from citrus fruits—lemons, oranges, grape-fruit, etc., although the process and product are applicable to fruits other than of the citrus variety.

Practice has shown that the pith of the citrus fruit, such as oranges and lemons, when properly treated, as hereinafter explained, yield a pith extract which has the peculiar quality of clarifying and preserving not only the juices of the same fruit but of various other fruits, like for example pineapple juice, sweet cider, etc.

The method of carrying out this process is as follows:

1st.—The lemons (or other fruit), are first peeled or split and grated or rended. If peeled, care should be taken to leave considerable of the white pith which constitutes the inner layer of the peel; if grated, the grating should be done with a sharp instrument and considerable of the white pith grated out as well as the fruit cells and pulp. If the fruit is peeled, it should then be run through a grater or grinder, such as a meat grinder, to reduce it to a suitable pulp.

2nd.—The mixture of juice, pulp, and white pith is then treated with a very small amount of sulfur dioxid to preserve it during treatment and prevent certain undesired reactions which develop a bitter flavor in the juice. This bitter flavor usually develops within half an hour unless this sulfur dioxid or equivalent is used. In practice we employ approximately .015 of 1% by weight of sulfur dioxid.

3rd.—The juice is then strained off from this mixture through a rough filter of cloth or other material; the juice being collected and saved for further treatment in the process.

4th.—The residual pulp and pith is then subjected to high pressure by suitable means as a press or set of heavy rolls. By this pressure all the residual juice is extracted from the pulp and also a material is extracted from the white pith which is of a colloidal nature and resembles starch solution in appearance.

5th.—This material together with the juice extracted by the pressure is mixed with the original filtered juice of step 3.

6th.—The total mixture is treated with a small amount of soluble basic salt, such as calcium carbonate, calcium acetate, magnesium acetate, magnesium carbonate, etc. We preferably use in practice about .12 of 1% by weight of this basic material. The basic salts, especially calcium salts, have the effect of immediately coagulating the aforementioned colloidal material into a spongy mass. This coagulating action is greatly accelerated by holding the juice during coagulation at a temperature of from 25° to 35° C. At this temperature, the coagulation of the colloid starts at once and the whole mass becomes of a solid consistency like gelatin, within a few hours. Within a few hours following this coagulation, the coagulated mass commences to contract from all sides toward the center leaving the clear liquor on all sides, top and bottom. The constantly contracting "core" assumes the appearance of a sponge and has the same properties as to holding contained liquids. The coagulation also acts to clarify the juice of all other contained solids and of all material which might later separate out as precipitated solids.

7th.—After the "sponge core" of coagulated solids has sufficiently contracted, say in ten to twenty four hours from the time when the coagulant and basic salt is added to the juice and the mass warmed, the juice and "sponge core" is transferred onto a filter cloth in an apparatus so constructed that a small amount of pressure may be applied to the "sponge core." The clear juice is forced out from the "sponge core" and, together with the clear juice surrounding the "sponge core" runs through the filter cloth which removes any traces of sponge etc. The clear juice is then in shape for bottling.

8th.—The juice is then pasteurized, preferably in the bottles, at a temperature of from 55° to 60° C. after which it keeps indefinitely.

The acidity of the processed juice remains substantially the same as that of the original fresh juice.

Having thus described our invention, what we claim and desire to secure by Letters Patent is—

1. The process of clarifying fruit juices which comprises treating such juices with pith extract of a vegetable pith.

2. The process of clarifying fruit juices which comprises treating such juices with pith extract of a citrus fruit pith.

3. The process of clarifying citrus fruit juices which comprises treating such juices with pith extract of a citrus fruit pith.

4. The process of clarifying fruit juices which comprises treating such juices with pith extract of a vegetable pith together with a reagent promoting the coagulation of such extract.

5. The process of clarifying fruit juices which comprises treating such juices with pith extract of a citrus fruit pith together with a reagent promoting the coagulation of such extract.

6. The process of clarifying citrus fruit juices which comprises treating such juices with pith extract of a citrus fruit pith together with a reagent promoting the coagulation of such extract.

7. The process of treating citrus fruit which comprises reducing the pith of such fruit to a pulp and subjecting the resulting pulp to pressure to express the pith extract therefrom.

8. The process of treating citrus fruit which comprises reducing the pith together with the fruit to a pulp, and subjecting the resulting pulp to pressure to express the extract and juice therefrom.

9. The process of treating citrus fruit which comprises reducing the pith together with the fruit to a pulp, separating the main part of the fruit juice, expressing the fruit juice and pith extract from the remaining pulp, and treating the fruit juice with the pith extract to clarify the same.

10. The process of treating citrus fruit which comprises reducing the pith together with the fruit to a pulp, separating the main part of the fruit juice, expressing the fruit juice and pith extract from the remaining pulp, and treating the fruit juice with the pith extract and a reagent promoting the coagulation of such extract to clarify the fruit juice.

11. The process of treating citrus fruit which comprises reducing the pith together with the fruit to a pulp, separating the main part of the fruit juice, expressing the fruit juice and pith extract from the remaining pulp, and treating the fruit juice with the pith extract and with a small amount of a calcium salt to clarify the same.

12. The process of treating citrus fruit which comprises reducing the pith together with the fruit to a pulp, separating the main part of the fruit juice, expressing the fruit juice and pith extract from the remaining pulp, and treating the fruit juice with the pith extract and with a small amount of a calcium salt to clarify the same, and maintaining the juice at about 25 to 35° C. until coagulation has been effected.

13. The process of preserving fruit juices which comprises rending the fruit portion, the juice of which is to be preserved, adding to the rended fruit and its juices the pith of a citrus fruit, treating the mixture with a suitable preservative, separating the juices and the pith extract, adding a suitable coagulant to the separated juices and extract, maintaining the juices at a temperature of about 25° to 35° C. until coagulation has taken place of the pith extract, and separating the resulting liquid from the coagulated solids.

14. The process of preserving citrus fruit juices which comprises adding the white pith of the fruit to the pulp and juices, adding a preservative to prevent the development of a bitter flavor in the juice, separating the fruit juices and pith extract from the pulp and allowing the pith extract to react on the fruit juices to clarify the same.

15. The process of preserving citrus fruit juices which comprises adding the white pith of the fruit to the pulp and juices, adding a preservative to prevent the development of a bitter flavor in the juice, separating the fruit juices and pith extract from the pulp by subjecting the pulp to pressure, and adding a coagulant of the pith extract to promote the clarification of the juices.

16. The process of clarifying fruit juices which comprises adding thereto the pith extract of a citrus fruit together with a coagulant, maintaining the juices at a temperature of about 25° to 35° C. until the solids assume a gelatinous or spongy appearance, and separating such solids from the clear liquid.

17. The process of treating citrus fruit which comprises reducing the fruit together with the fruit pith to a pulp, adding a suitable preservative, straining off the fruit juices, subjecting the pulp to pressure to express the fruit juices and the pith extract, mixing the expressed juices and extract with the fruit juices, adding a small amount of a suitable coagulant, and maintaining the juices at a suitable temperature until coagulation of the solids therein has been effected.

18. The process of treating citrus fruit which comprises reducing the fruit together with the fruit pith to a pulp, adding a suitable preservative, straining off the fruit juices, subjecting the pulp to pressure to express the fruit juices and the pith extract, mixing the expressed juices and extract with the fruit juices, adding a small amount of a suitable coagulant, and maintaining the juices at a temperature of about 25° to 35° C. until coagulation of the solids therein has been effected.

19. As a new product, pith extract of a vegetable pith, said extract containing pith constituents of a colloidal nature and having valuable fruit juice clarifying properties.

20. As a new product, pith extract of citrus fruit pith, said extract containing pith constituents of a colloidal nature and having valuable fruit juice clarifying properties.

21. As a new product, pith extract of citrus fruit pith, said extract resembling starch solution in appearance and containing pith constituents of a colloidal nature, and having valuable fruit juice clarifying properties.

22. As a new product, pith extract of lemon pith, said extract resembling starch solution in appearance and containing pith constituents of a colloidal nature, and having valuable fruit juice clarifying properties.

23. As a new product, pith extract of citrus fruit pith, said extract containing pith constituents of a colloidal nature together with juices of such fruit and having valuable fruit juice clarifying properties.

24. As a new product, pith extract of citrus fruit pith, said extract resembling starch solution in appearance and containing pith constituents of a colloidal nature together with juices of the lemon, and having valuable fruit juice clarifying properties.

In testimony whereof we have hereunto set our hands in the presence of two subscribing witnesses.

CHARLES ELDRID BURKE.
DONALD EASTMAN FOGG.

Witnesses:
CHAS. F. RYAN,
JOHN T. OVERBURY.